(12) United States Patent
Ku

(10) Patent No.: US 7,242,149 B1
(45) Date of Patent: Jul. 10, 2007

(54) LAMP DRIVING CIRCUIT WITH FLOATING POWER SUPPLY DRIVER

(75) Inventor: Cheng-Lung Ku, 14 Fl., No. 237, Shengli Rd., Taichung Hsien (TW)

(73) Assignees: Cheng-Lung Ku, Tanzih Hsiang, Taichung Hsien (TW); Everlite Opto-Electronics International LLC, Newark, DE (US)

( * ) Notice: Subject to any disclaimer, the term of this patent is extended or adjusted under 35 U.S.C. 154(b) by 0 days.

(21) Appl. No.: 11/463,586

(22) Filed: Aug. 9, 2006

(51) Int. Cl.
*H05B 37/02* (2006.01)
(52) U.S. Cl. .............. 315/224; 315/227 R; 315/DIG. 7
(58) Field of Classification Search ................ 315/224, 315/227 R, DIG. 7
See application file for complete search history.

(56) References Cited

U.S. PATENT DOCUMENTS 6,100,647 A * 8/2000 Giannopoulos et al. ..... 315/224
7,095,183 B2 * 8/2006 Alexandrov ................ 315/224

* cited by examiner

*Primary Examiner*—David Vu
(74) *Attorney, Agent, or Firm*—James H. Walters

(57) ABSTRACT

A lamp driving circuit with a floating power supply driver includes a microcomputing unit, a floating power supply driver, and a driving unit. The microcomputing unit and the floating power supply driver are independent integrated circuits and manufactured under a normal voltage. The floating power supply driver is coupled to the microcomputing unit via two independent high-pressure coupling capacitors, instead of sharing the same ground with the microcomputing unit. The microcomputing unit and the floating power supply driver provide at least one low-voltage driving pulse output pin and one high-voltage driving pulse output pin to control the power transistor inside the driving unit. The power transistor turns on/off at appropriate time so that a lamp connected to the driving unit can be lit up by a driving high voltage.

9 Claims, 6 Drawing Sheets

LAMP DRIVING CIRCUIT WITH FLOATING POWER SUPPLY DRIVER

BACKGROUND OF THE INVENTION

1. Field of the Invention

The invention relates to a lamp driving circuit with a floating power supply driver and, in particular, to a lamp driving circuit using individual integrated circuits (ICs) prepared in a normal voltage process to control high- and low-voltage driving transistors.

2. Description of Related Art

As shown in FIG. 6, a driving circuit using a current transformer is used to drive a gas discharging lamp 60. The circuit includes a bidirectional switch connected to the DC input side, a current transformer 62, and two power transistors 63, 64 composed of metal oxide semiconductor field effect transistor (MOSFET). The primary winding of the current transformer 62 is connected in series with the lamp 60. Its secondary winding is connected to the two power transistors 63, 64. The lamp 60 is connected in series to an LC circuit composed of an inductor 65 and capacitors 66, 67. The other end of the capacitor 66 is coupled to the primary winding of the current transformer 62.

The above-mentioned circuit provides a pulse current for the circuit to oscillate after the bidirectional switch 61 is closed. Its oscillation frequency is the resonance frequency for the system of the inductor 65 and the capacitor 66. More explicitly, when the power transistor 64 is conductive, the circuit keeps oscillating and uses a high frequency to excite the LC circuit. As a result of the Q resonance of the circuit, the voltage imposed on both ends of the capacitor 67 is amplified sufficiently to trigger the discharge of the lamp 60.

The above-mentioned driving circuit is originally composed of bipolar transistors. After modification, they are replaced by the MOSFET. However, the circuit structure is not suitable for using the MOSFET because it does not have a good wave form.

With reference to FIG. 7, in view of the drawbacks in the previous circuit, U.S. Pat. No. 5,545,955 proposes a driving integrated circuit (IC) 70 suitable for using the MOSFET. The driving IC 70 has a high-voltage output Ho and a low-voltage output Lo coupled to the two power transistors 63, 64, respectively. The driving IC further has an output Vs connecting to the serial connection point of the two transistors 63, 64, the LC circuit, and the gas discharging lamp 60.

According to the working principle of the gas discharging lamp 60, an extremely high driving voltage is required to start the lamp. In fact, inside the driving IC 70, a high-voltage coupling capacitor exists between the high-voltage output Ho and the low-voltage output Lo. It has to be able to withstand hundreds of volts. Due to the existence of the high-voltage coupling capacitor, the material selection, internal device design, and circuit layout of the driving IC 70 have to take into account the high-voltage process. This complicates the manufacturing process and increases the production cost.

The ICs currently used for driving lamps have to be manufactured in a high-voltage process. This is the main reason why the cost and complexity cannot be reduced.

SUMMARY OF THE INVENTION

An objective of the invention is to provide an IC circuit that can be manufactured in a normal voltage process to reduce the circuit production cost.

To achieve the above objective, the invention includes:

a microcomputing unit (MCU), which is an independent IC device and has at least one low-voltage driving pulse output pin and two control signal output pins;

a floating power supply driver, which is an independent IC device and couples to the two control signal output pins of the MCU via two independent high-voltage coupling capacitor, wherein the floating power supply driver does not share the same ground with the MCU and has at least one high-voltage driving pulse output pin;

a driving unit, which is coupled between a driving high voltage and a ground and is controlled by the MCU and the floating power supply driver to start a lamp.

The above-mentioned driving unit can have a full bridge or half bridge structure. In the case of the full bridge structure, it contains two high-voltage power transistor and two low-voltage power transistors. The microcomputing g unit provides two low-voltage driving pulse output pins to connect to the low-voltage power transistors. The floating power supply driver also provides two high-voltage driving pulse output pins to connect to the high-voltage power transistors.

In the case of the half bridge structure, the driving unit contains a high-voltage power transistor and a low-voltage power transistor. The high-voltage power transistor is coupled to the driving high voltage and the high-voltage driving pulse output pin of the floating power supply driver. The lower-voltage side power transistor is coupled between the high-voltage power transistor and the ground. The low-voltage power transistor is coupled to the low-voltage driving pulse output pin of the MCU at the same time.

The above-mentioned high-voltage power transistor and low-voltage power transistor can be composed of bipolar transistors or MOSFETs.

DETAILED DESCRIPTION OF THE PREFERRED EMBODIMENT

Figure 1:
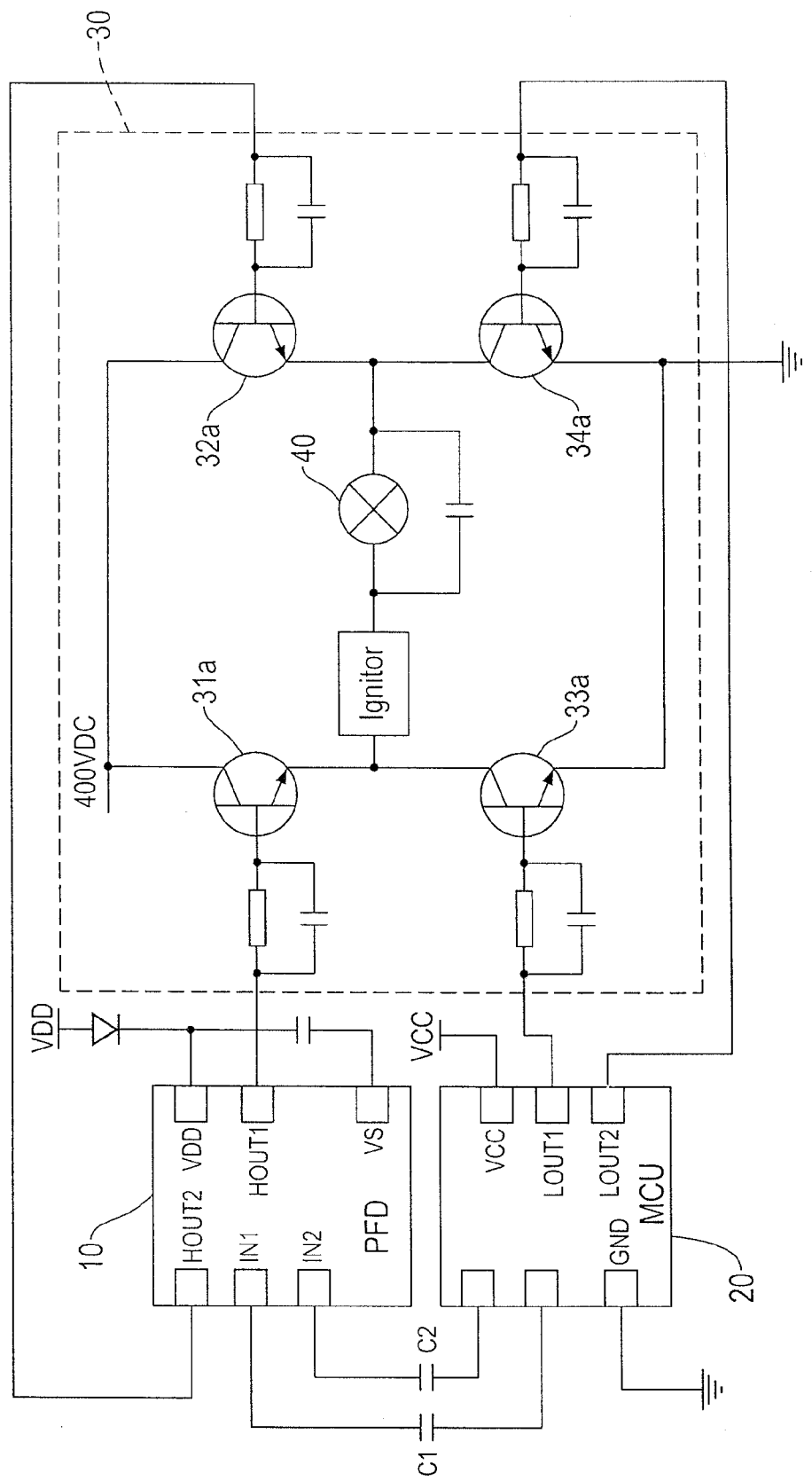
FIG. 1 is a circuit diagram of an embodiment of the present invention.

With reference to FIG. 1, the disclosed lamp driving circuit uses a floating power supply driver 10 and a microcomputing unit (MCU) 20 coupled to the floating power supply driver. Both of them control a driving unit 30 that is connected to both sides of a lamp 40. The MCU 20 can be a universal pulse width modulation control circuits (e.g., TL494CD) and can be fabricated as an application specific integrated circuit (ASIC).

The driving unit 30 in this embodiment is a full bridge structure composed of four bipolar power transistors 31a~34a, coupled between a driving high voltage (e.g., 400V) and the ground. The power transistors 31a, 32a are connected to the driving high voltage as the high voltage side driving transistors. The rest two transistors 33a, 34a as the low-voltage side driving transistors are coupled between the power transistors 31a, 32a, and the ground, respectively. The lamp 40 can be any type of power-saving or incandescent lamp coupled in the middle of the full bridge structure, i.e., between the high-voltage side and the low-voltage side.

The floating power supply driver 10 has two high-voltage driving pulse output pins HOUT1 and HOUT2 coupled to the bases of the high-voltage power transistors 31a, 32a in the full bridge structure via resistors R1 and R2, respectively. The MCU 20 provides two low-voltage driving pulse output pins LOUT1 and LOUT2 to connect to the low-voltage power transistors 33a, 34a.

The floating power supply driver 10 has two coupling output pins coupled to two high-voltage coupling capacitors C1, C2, respectively. The floating power supply driver 10 is coupled to the two control signal output pins of the MCU 20 via the high-voltage coupling capacitors C1, C2. It is preferred to use capacitors that can withstand voltages as high as 400V for the high-voltage coupling capacitors C1, C2 in order to achieve desired high-voltage insulation effects.

Figure 2:
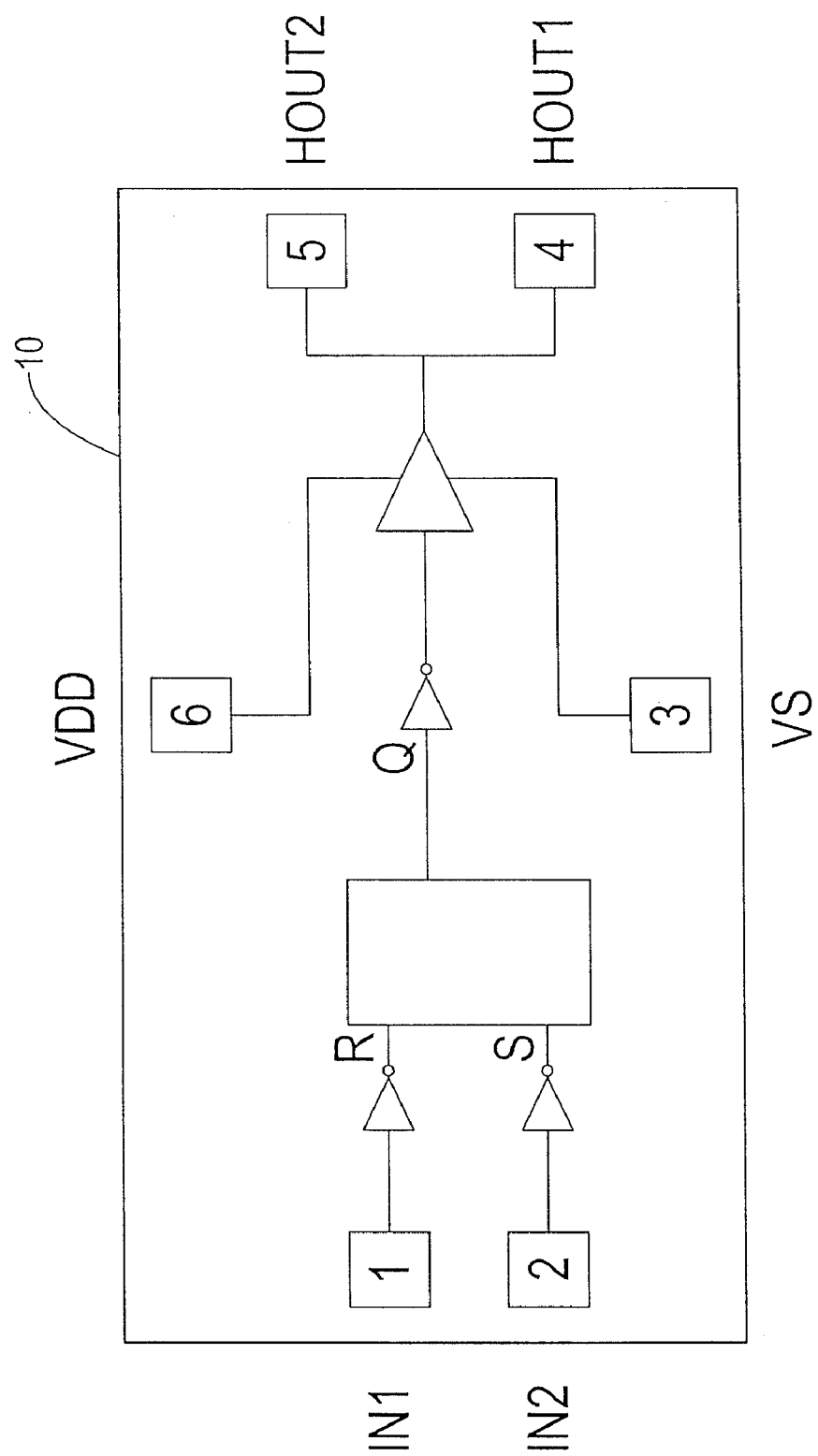
FIG. 2 is a logic block diagram of the internal circuit of a floating power supply driver in accordance with the present invention.

Please refer to FIG. 2. The floating power supply driver 10 is an IC prepared using the CMOS process. The internal logic device design as shown in the drawing includes a comparing and operating amplification circuit. The floating power supply driver 10 has the following pins:

A power supply pin VDD is connected to a DC power source for providing the work voltage of the floating power supply driver 10, e.g., DC 8~15V.

A negative power supply pin VS, which is the negative terminal of a high-voltage pumping current, is connected to the middle junction of the half bridge structure, when the driving unit 30 is a half bridge structure.

There is at least one high-voltage driving pulse output pin HOUT1 for driving a high-voltage side field effect transistor (FET). The drawing shows two output pins HOUT1, HOUT2 for a full bridge structure.

A first low-voltage signal input pin IN1 is coupled to the MCU 20 via the high-voltage coupling capacitor C1.

A second low-voltage signal input pin IN2 is coupled to the MCU 20 via the high-voltage coupling capacitor C2.

The working principle of the above-mentioned driving circuit is as follows. The MCU 20 has the self-oscillating function. Its oscillating signal is transmitted via the two high-voltage coupling capacitors C1, C2 to the floating power supply driver 10. In this case, the MCU 20 and the floating power supply driver 10 appropriately outputs a control signal to the power transistors 31a~34a according to the oscillating signal. The high-voltage power transistors 31a, 32a and the lower-voltage side power transistors 33a, 34a are alternatively conductive, so that the driving high voltage excites and starts the lamp 40.

Figure 3:
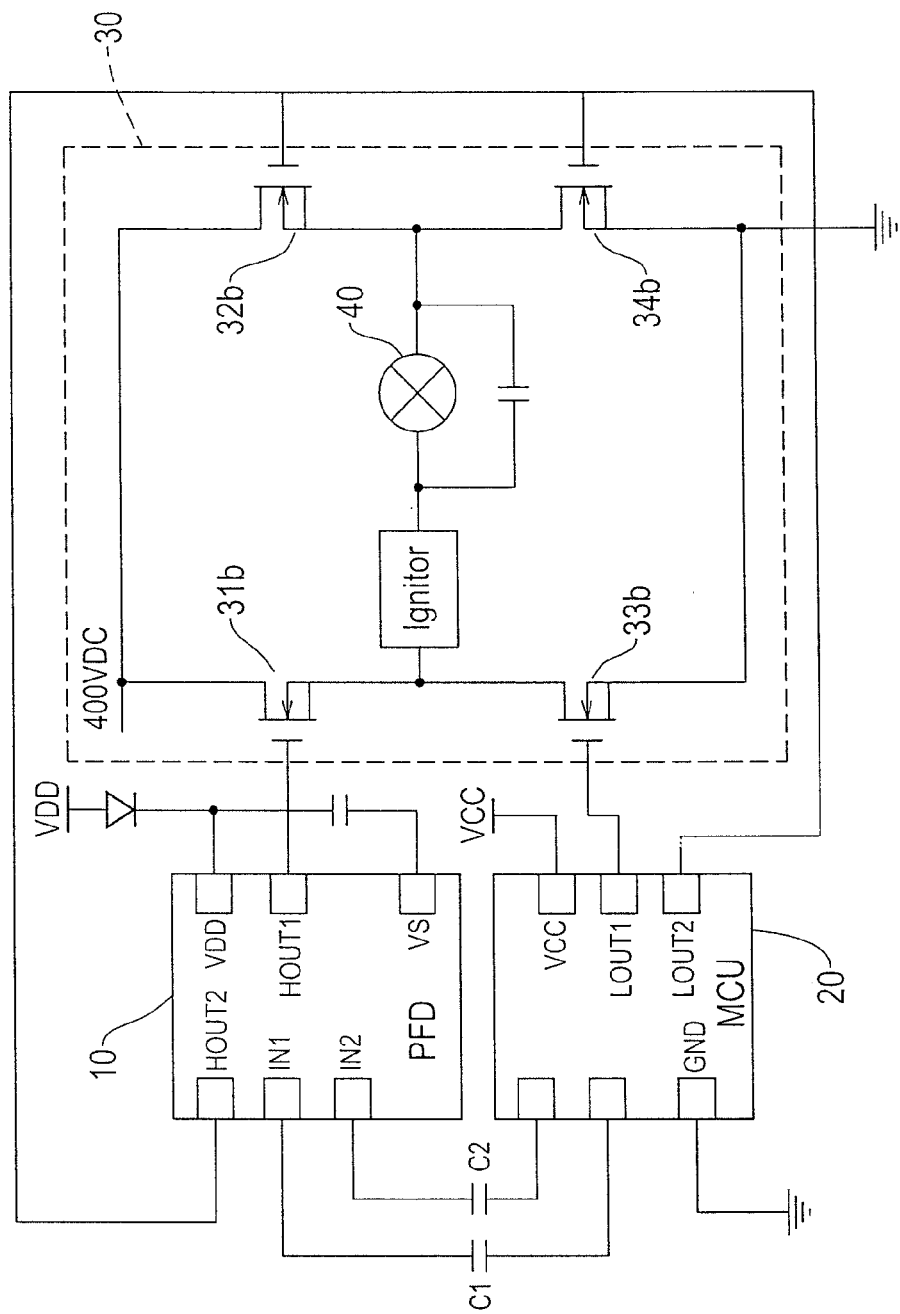
FIG. 3 is a circuit diagram of another embodiment of the present invention.

In addition to the bipolar power transistors 31a~34a in FIG. 1, the disclosed full bridge structure can be composed of the metal oxide semiconductor (MOS) power transistors 31b~32b shown in FIG. 3 as well. Its action principle is the same as the embodiment in FIG. 1.

Figure 4:
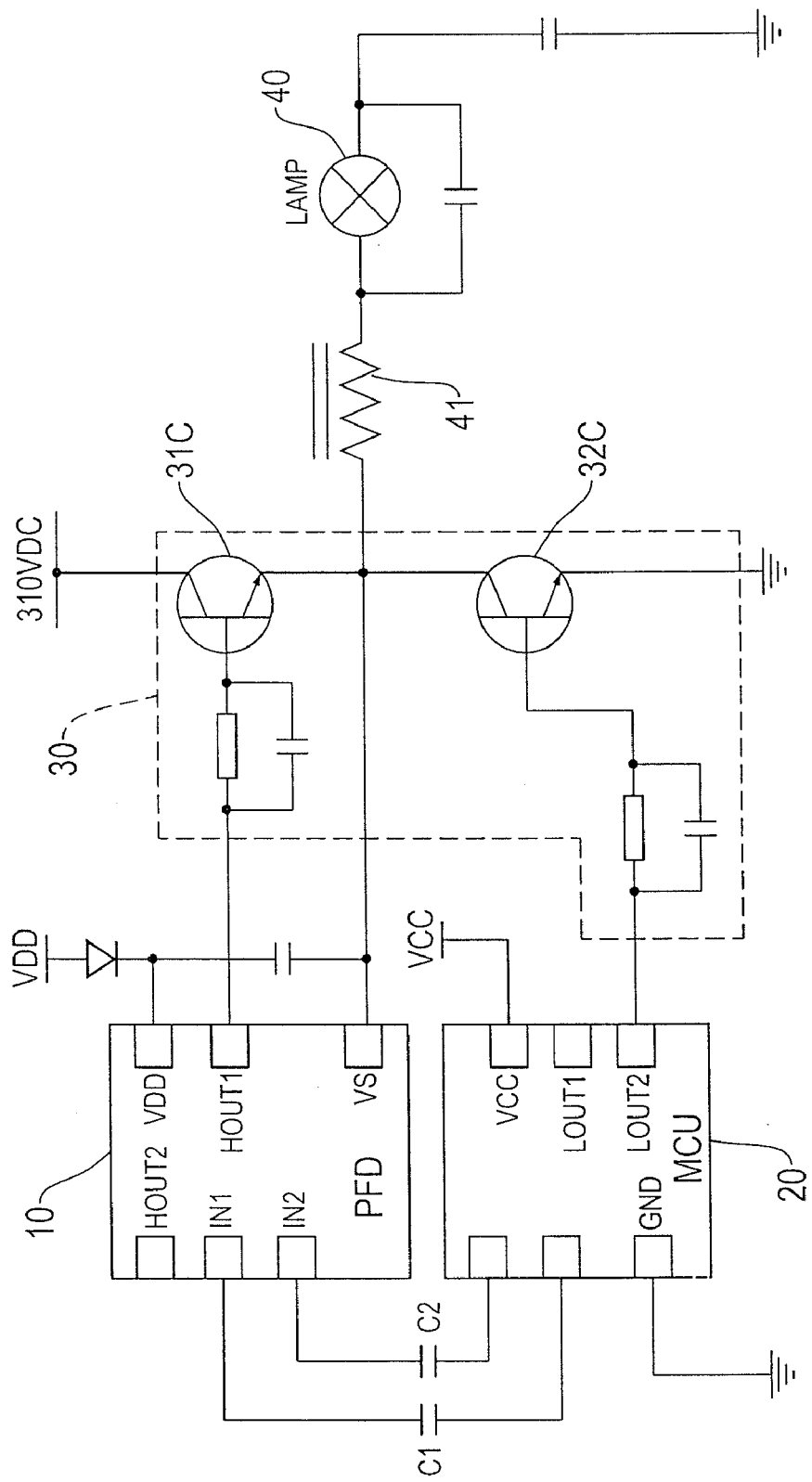
FIG. 4 is a circuit diagram of yet another embodiment of the present invention.

With reference to FIG. 4, the driving unit 30 uses bipolar power transistors 31c, 32c to form a half bridge structure. One of the power transistors 31c is controlled by the high-voltage driving pulse output pin HOUT1 of the floating power supply driver 10. The other power transistor 32c is controlled by the low-voltage driving pulse output pin LOUT2 of the MCU 20. The serial connection junction of the two power transistors 31c, 32c are connected to the negative power supply pin VS of the floating power supply driver 10. The serial connection junction is also connected to one end of the lamp 40 via a trigger 41. The other end of the lamp 40 is connected to the ground.

The driving unit 40 of the half bridge structure is coupled between a driving high voltage (e.g., 310V) and the ground. The floating power supply driver 10 and the MCU 20 alternatively send out a driving signal for the power transistors 31c, 32c to be alternatively conductive. The driving high voltage thus starts the lamp 40 via the trigger 41.

Figure 5:
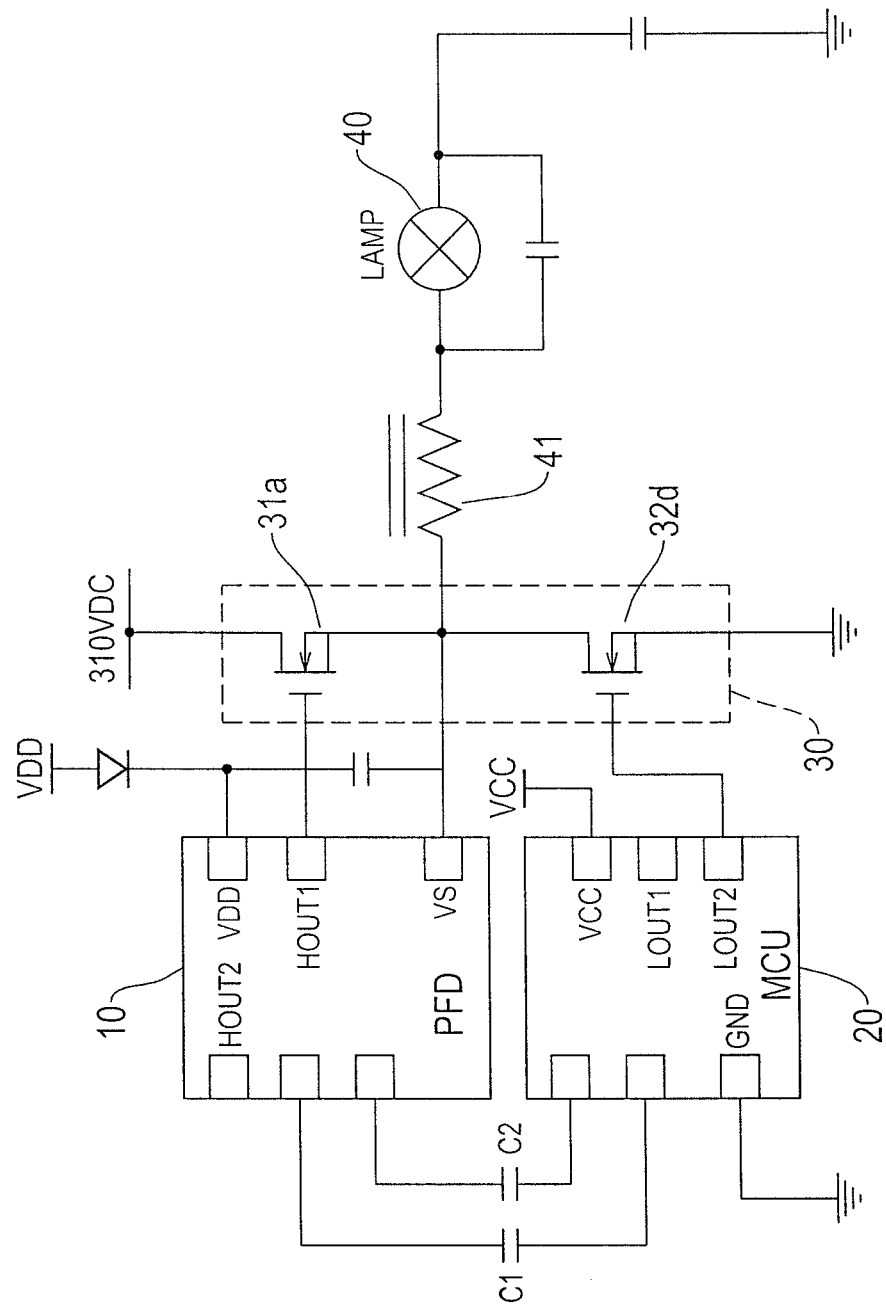
FIG. 5 is a circuit diagram of a further embodiment of the present invention.
Figure 6:
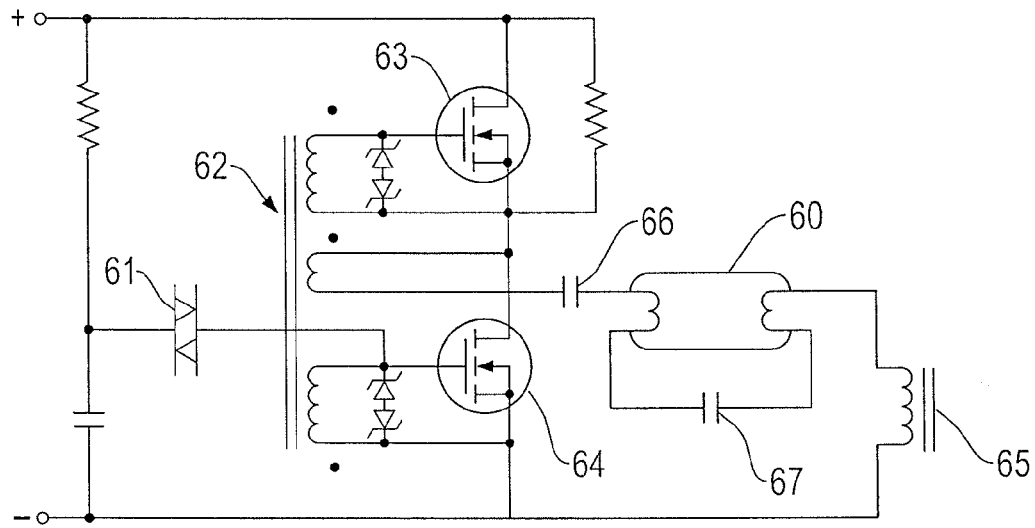
FIG. 6 is a lamp driving circuit using current transformer.
Figure 7:
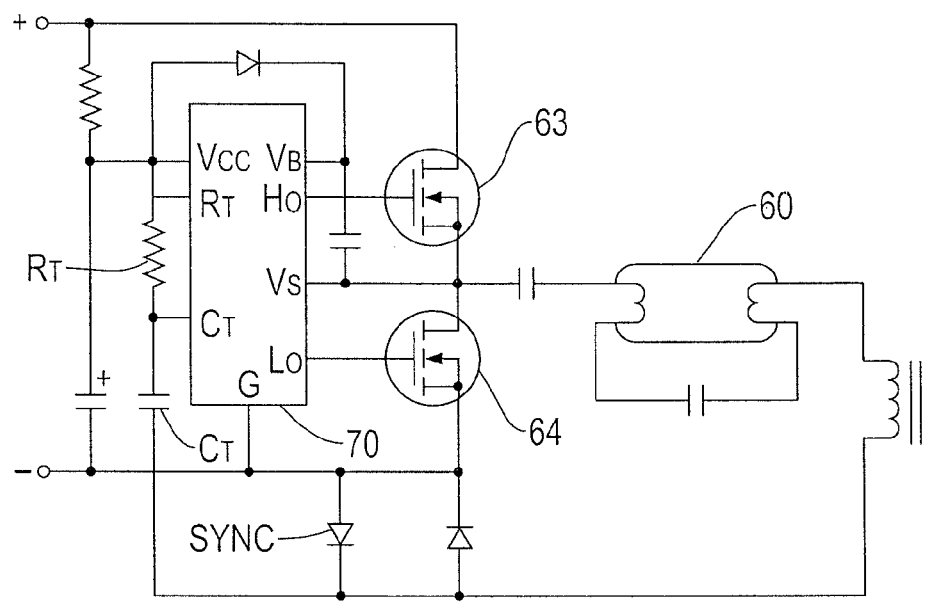
FIG. 7 is a lamp driving circuit using driving ICs.

The bipolar power transistors 31c, 32c in the above-mentioned half bridge circuit can be replaced by the MOS power transistors 31d, 32d, as shown in FIG. 5.

According to the above four different embodiments, the invention always use two independent ICs and two high-voltage coupling capacitors to control the driving high voltage. This method has the following advantages:

1. Due to the use of high-voltage coupling capacitors of independent devices instead of being integrated in the IC, the floating power supply driver and the MCU do not require be manufactured using a high-voltage process. The existing normal voltage process (3V~20V) is sufficient, thereby greatly reducing the production cost and complexity. Besides, high-voltage coupling capacitors of independent devices can be readily obtained at a relatively low cost.

2. The invention uses the design of a separate power supply circuit. That is, the floating power supply driver and the MCU do not share the same ground. High-voltage coupling capacitors are used to achieve insulation between high- and low-voltage blocks. The use of two capacitors ensures that the control signal transmitted from the low-voltage end (MCU) to the high-voltage end (floating power supply driver) does not cause incorrect actions due to noise interference.

3. The invention can be applied to various types of circuits. Using a full-bridge or half-bridge driving unit, the floating power supply driver and the MCU can be appropriately controlled. Moreover, both bipolar and MOSFET transistors can be used in the invention.

What is claimed is:

1. A lamp driving circuit with a floating power supply driver, comprising:
 a microcomputing unit (MCU), which is an independent integrated circuit (IC) device and has at least one low-voltage driving pulse output pin and two control signal output pins;
 a floating power supply driver, which is an independent IC device and, coupled to the two control signal output pins of the MCU via two independent high-voltage coupling capacitors, is controlled by the MCU without sharing the same ground, and has at least one high-voltage driving pulse output pin; and
 a driving unit, which is coupled between a driving high voltage and a ground and is controlled by the MCU and the floating power supply driver to start a lamp.

2. The lamp driving circuit with a floating power supply driver as claimed in claim 1, wherein the MCU has two low-voltage driving pulse output pins, the floating power supply driver has two high-voltage driving pulse output pins, and the driving unit is a full bridge structure comprising:
 two high-voltage power transistors coupled to the two high-voltage driving pulse output pins of the floating power supply driver, respectively, and the driving high voltage; and
 two low-voltage power transistors coupled to the two high-voltage power transistors, respectively, and the ground;

wherein the lamp is coupled between the two serial connection junctions of the two high-voltage power transistors and the two low-voltage power transistors.

3. The lamp driving circuit with a floating power supply driver as claimed claim 1, wherein the driving unit is a half bridge structure comprising:
   one high-voltage power transistor, which is coupled to the driving high voltage and the high-voltage driving pulse output pin of the floating power supply driver; and
   one low-voltage power transistor, which is coupled between the high-voltage power transistor and the ground and to the low-voltage driving pulse output pin of the MCU;
   wherein one end of the lamp is connected to the serial connection junction between the high-voltage power transistor and the low-voltage power transistor and the other end to the ground.

4. The lamp driving circuit with a floating power supply driver as claimed in claim 2, wherein the high-voltage power transistor and the low-voltage power transistor are bipolar transistors.

5. The lamp driving circuit with a floating power supply driver as claimed in claim 3, wherein the high-voltage power transistor and the low-voltage power transistor are bipolar transistors.

6. The lamp driving circuit with a floating power supply driver as claimed in claim 2, wherein the high-voltage power transistor and the low-voltage power transistor are metal oxide semiconductor field effect transistors (MOSFETs).

7. The lamp driving circuit with a floating power supply driver as claimed in claim 3, wherein the high-voltage transistor and the low-voltage power transistor are metal oxide semiconductor field effect transistors (MOSFETs).

8. The lamp driving circuit with a floating power supply driver as claimed in claim 1, wherein the inside of the floating power supply driver includes a comparing and operating amplification unit and, in addition to the high-voltage driving pulse output pins, further has:
   a power supply pin, which is connected to a DC power source for providing the working voltage of the floating power supply driver;
   a negative power supply pin, which is the negative terminal of a high-voltage pumping current; and
   two low-voltage signal input pins, which are connected to the MCU via the two high-voltage coupling capacitors.

9. The lamp driving circuit with a floating power supply driver as claimed in claim 3, wherein the inside of the floating power supply driver includes a comparing and operating amplification unit and, in addition to the high-voltage driving pulse output pins, further has:
   a power supply pin, which is connected to a DC power source for providing the working voltage of the floating power supply driver;
   a negative power supply pin, which is the negative terminal of a high-voltage pumping current connected to the serial connection junction between the high-voltage power transistor and the low-voltage power transistor; and
   two low-voltage signal input pins, which are connected to the MCU via the two high-voltage coupling capacitors.

* * * * *